US009020465B2

(12) United States Patent
Nousiainen et al.

(10) Patent No.: US 9,020,465 B2
(45) Date of Patent: *Apr. 28, 2015

(54) SHARING NETWORK CAPACITY WITH ANOTHER DEVICE

(71) Applicant: Uros Oy, Oulu (FI)

(72) Inventors: Marko Nousiainen, Oulu (FI); Tommi Uhari, Oulu (FI)

(73) Assignee: Uros Technology S.À.R.L., Ettelbruck (LU)

( * ) Notice: Subject to any disclaimer, the term of this patent is extended or adjusted under 35 U.S.C. 154(b) by 117 days.

This patent is subject to a terminal disclaimer.

(21) Appl. No.: 13/857,492

(22) Filed: Apr. 5, 2013

(65) Prior Publication Data

US 2013/0316672 A1    Nov. 28, 2013

(30) Foreign Application Priority Data

May 28, 2012    (EP) ..................................... 12397516

(51) Int. Cl.
*H04M 11/00*    (2006.01)
*H04M 1/00*    (2006.01)
(Continued)

(52) U.S. Cl.
CPC ................ *H04W 4/24* (2013.01); *H04W 4/001* (2013.01); *H04W 4/003* (2013.01); *H04W 12/08* (2013.01); *H04W 48/02* (2013.01); *H04W 84/18* (2013.01); *H04L 12/1467* (2013.01); *H04L 63/0853* (2013.01); *H04L 63/18* (2013.01);
(Continued)

(58) Field of Classification Search
USPC ......... 455/406–408, 418–420, 410–411, 558, 455/450, 452.1, 41.2–41.3
See application file for complete search history.

(56) References Cited

U.S. PATENT DOCUMENTS 7,529,542 B1    5/2009 Chevion et al.
8,364,205 B2 *   1/2013 Tsai et al. ..................... 455/558
(Continued)

FOREIGN PATENT DOCUMENTS

DE    20 2010 005832 U1    10/2010
EP    2 391 179 A1    11/2011
(Continued)

OTHER PUBLICATIONS

Extended Search Report issued in European Patent Application No. 12397516.1 dated Nov. 15, 2012.
(Continued)

*Primary Examiner* — Brandon Miller
(74) *Attorney, Agent, or Firm* — Oliff PLC

(57) ABSTRACT

There is provided a cause a reception of information from a second device, wherein the information indicates a need to utilize the network capacity of the apparatus by the second device; detect an identifier of the second device in order to enable identification of the second device; determine whether or not to allow the second device to utilize the network capacity on the basis of the identification; upon deciding to allow the second device to utilize the network capacity of the apparatus, cause transfer of data between the second device and an accessed network, wherein the network is accessible with a specific subscriber identity module, SIM, of the apparatus; determine predetermined at least one characteristic related to the data transfer of the second device; cause transmission of information indicating the at least one characteristic to an entity responsible of invoicing data transfers with respect to the specific SIM.

12 Claims, 5 Drawing Sheets

(51) Int. Cl.
- *H04W 4/24* (2009.01)
- *H04W 4/00* (2009.01)
- *H04L 29/06* (2006.01)
- *H04W 12/06* (2009.01)
- *H04M 15/00* (2006.01)
- *H04W 12/08* (2009.01)
- *H04W 48/02* (2009.01)
- *H04W 84/18* (2009.01)
- *H04L 12/14* (2006.01)

(52) U.S. Cl.
CPC ......... *H04W 12/06* (2013.01); *H04M 15/8044* (2013.01); *H04M 15/8083* (2013.01); *H04M 15/93* (2013.01)

(56) References Cited

U.S. PATENT DOCUMENTS

| | | | |
|---|---|---|---|
| 8,422,991 B2 * | 4/2013 | Lazaridis | 455/408 |
| 8,700,092 B2 | 4/2014 | De Petris et al. | |
| 8,768,324 B2 | 7/2014 | Yang et al. | |
| 2006/0291483 A1 | 12/2006 | Sela | |
| 2007/0167173 A1 * | 7/2007 | Halcrow et al. | 455/456.2 |
| 2007/0184858 A1 * | 8/2007 | Landschaft et al. | 455/466 |
| 2008/0039102 A1 * | 2/2008 | Sewall et al. | 455/445 |
| 2008/0081611 A1 | 4/2008 | Hoyt et al. | |
| 2009/0233610 A1 | 9/2009 | Paetsch | |
| 2012/0115542 A1 | 5/2012 | Griffin et al. | |
| 2012/0309374 A1 | 12/2012 | Tagg et al. | |
| 2013/0012208 A1 | 1/2013 | Jeong | |
| 2013/0281064 A1 | 10/2013 | Hedberg et al. | |
| 2013/0316672 A1 | 11/2013 | Nousiainen et al. | |

FOREIGN PATENT DOCUMENTS

| | | | |
|---|---|---|---|
| EP | 2391179 A1 * | 11/2011 | H04W 84/18 |
| WO | WO 2005/104575 A1 | 11/2005 | |

OTHER PUBLICATIONS

"The DTT® Virtual SIM System for Carrier Class GSM Gateways;" *Discovery Telecom Technologies*; http://www.iptech.com/us/downloads/gsmgate/dtt/dttsim.pdf; Dec. 19, 2006; pp. 1-30.

Extended European Search Report dated Oct. 22, 2012 from European Patent Application No. 12169678.5.

U.S. Office Action dated Jul. 25, 2014 from U.S. Appl. No. 13/857,628.

U.S. Office Action dated Nov. 13, 2014 from U.S. Appl. No. 13/857,628.

* cited by examiner

SHARING NETWORK CAPACITY WITH ANOTHER DEVICE

FIELD

The invention relates generally to communication networks. More particularly, the invention relates to sharing the network capacity of a certain device with another device.

BACKGROUND

There may be situations where a device in the need of a network connection is not in the coverage area of any wireless network. Instead of moving to another location, it may be possible that the device utilizes the network connection of another device locating nearby. However, there are several issues that need to be solved in such scenario.

BRIEF DESCRIPTION OF THE INVENTION

According to an aspect of the invention, there are provided apparatuses as specified in claims 1 and 10.

According to an aspect of the invention, there is provided a computer program product embodied on a distribution medium readable by a computer and comprising program instructions which, when loaded into an apparatus, execute any of the embodiments as described in the appended claims.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a communication scenario according to an embodiment;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

It may often happen that a certain device needs to access to a network which is present in the location of the device. However, the use of the existing network without a certain prerequisite may be denied. It may also be that any free-to-use wireless network is unavailable at the location. It may also be that the available network is expensive to use. The prerequisite may be that the device is required to comprise a certain at least one subscriber identity module (SIM), for example. As known to a skilled person, the SIM is a logical entity on the physical card storing user subscriber information, authentication information, text messages, and phone book contacts, for example.

In an embodiment, the network requiring the prerequisite for access may be a wireless cellular communication network. In another embodiment, the network requiring the prerequisite for access is a wireless local area network (WLAN), also requiring a SIM for the access, or alike network. However, let as assume that the network is a cellular network. Owing to the information of the SIM, a device associated with the SIM may connect to cellular communication network, such as to the 2G, 3G or to the long term evolution (LTE) networks, for example. The cellular communication network may apply communication services according to at least one of the following radio access technologies (RATs): Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), the long term evolution (LTE), and/or LTE Advanced (LTE-A).

Figure 1:
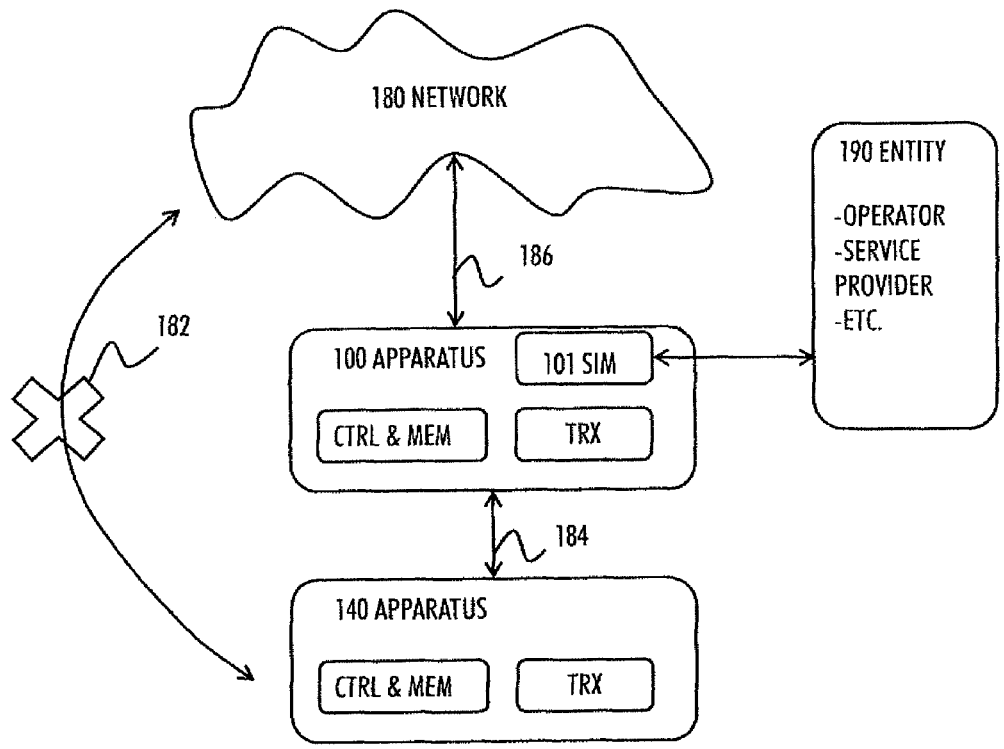

However, as the device does not comprise any SIMs or the required SIM, the access to the network may be denied or the SIM in use would mean roaming from one operator to another which may be expensive, slow or otherwise not good enough for use. Therefore, the device may need to explore further options for the network access and data transfers via the network. This is shown in FIG. 1, where the device 140 may be seen as the device requiring an access to the network 180 but being denied of such direct access to the network 180, as shown with a cross 182. Therefore, the device 140 may consider utilizing the network capacity of another (first) device 100. As shown, the device 100 (whose network capacity may be utilized by the (second) device 140) may comprise at least one SIM 101, which may allow the first device 100 to access to the network 180, for example. Let us take a closer look of the apparatus 100.

Figure 2:
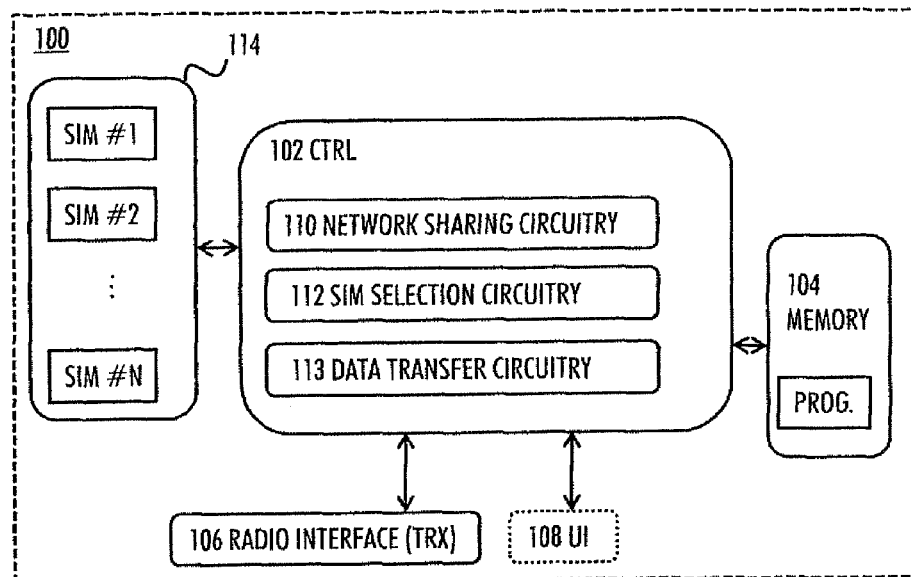
FIG. 2 shows an apparatus according to some embodiments.

An embodiment, as shown in FIG. 2, provides an apparatus 100 comprising a control circuitry (CTRL), such as at least one processor 102, and at least one memory 104 including a computer program code (PROG), wherein the at least one memory 104 and the computer program code (PROG), are configured, with the at least one processor 102, to cause the apparatus 100 to carry out any of the embodiments presented in the application with respect to the apparatus 100. It should be noted that FIG. 2 shows only the elements and functional entities required for understanding a processing system of the apparatus 100. Other components have been omitted for reasons of simplicity. It is apparent to a person skilled in the art that the apparatus may also comprise other functions and structures.

In an embodiment, the apparatus 100 may be a mobile wireless communication terminal, an accessory of a mobile wireless communication terminal, a combination of a mobile wireless communication terminal and an accessory of the mobile wireless communication terminal, an accessory of a mobile terminal, a combination of a mobile terminal and an accessory of the mobile terminal, or a USB (Universal Serial Bus) modem, or any other suitable mobile terminal capable of employing a set of subscriber identity modules 114, such as a mobile phone, a tablet, a portable computer, or a computer. Alternatively, the apparatus 100 is comprised in such a terminal device. Further, the apparatus 100 may be or comprise a module (to be attached to the apparatus) providing connectivity, such as a plug-in unit, an "USB dongle", or any other kind of unit. Therefore, the apparatus 100 may be understood to comprise, be, or be comprised in a device.

The apparatus 100 may further comprise radio interface component unit (TRX) 106 providing the apparatus with radio communication capabilities with the radio access network 180. The radio interface components 106 may comprise standard well-known components such as amplifier, filter, frequency-converter, (de)modulator, and encoder/decoder circuitries and one or more antennas. The TRX 106 may also be applied for communication with the device 140, for example.

The apparatus 100 may also comprise a user interface 108 comprising, for example, at least one keypad, a microphone, a touch display, a display, a speaker, etc. The user interface may be used to control the apparatus by the user. However, in another embodiment, there is no user interface in the apparatus 100. I.e. the end user may not be able to interact with the apparatus 100 by means of a touch display or mouse, for example. In this case, a skilled person may appreciate the automated processes carried out in the apparatus 100.

As said, the apparatus 100 may comprise a control circuitry 102, e.g. a chip, a processor, a micro controller, or a combination of such circuitries causing the apparatus to perform any of the embodiments of the invention. The control circuitry 102 may be implemented with a separate digital signal processor provided with suitable software embedded on a computer readable medium, or with a separate logic circuit, such as an application specific integrated circuit (ASIC). The control circuitry 102 may comprise an interface, such as computer port, for providing communication capabilities.

The memory 104 may store software (PROG) executable by the at least one control circuitry 102. The memory 104 may be connected to the control circuitry 102. However, memory may also be integrated to the control circuitry 102 and, thus, no memory 104 may be required. The memory 104 may be implemented using any suitable data storage technology, such as semiconductor based memory devices, flash memory, magnetic memory devices and systems, optical memory devices and systems, fixed memory and removable memory.

The control circuitry 102 may comprise a network sharing circuitry 110, a SIM selection circuitry 112, and a data transfer circuitry 113. The functions of these circuitries 110, 112, and 113 are detailed later.

As said, the apparatus 100 may further comprise at least one SIM 101. The SIM 101 may be applicable for accessing at least one network 180 in the area of the first device 100. There may even be a plurality of SIMs 114 in the apparatus as shown in FIG. 2. Let discuss the possibility of having a plurality of SIMs 114 later.

Figure 3A:
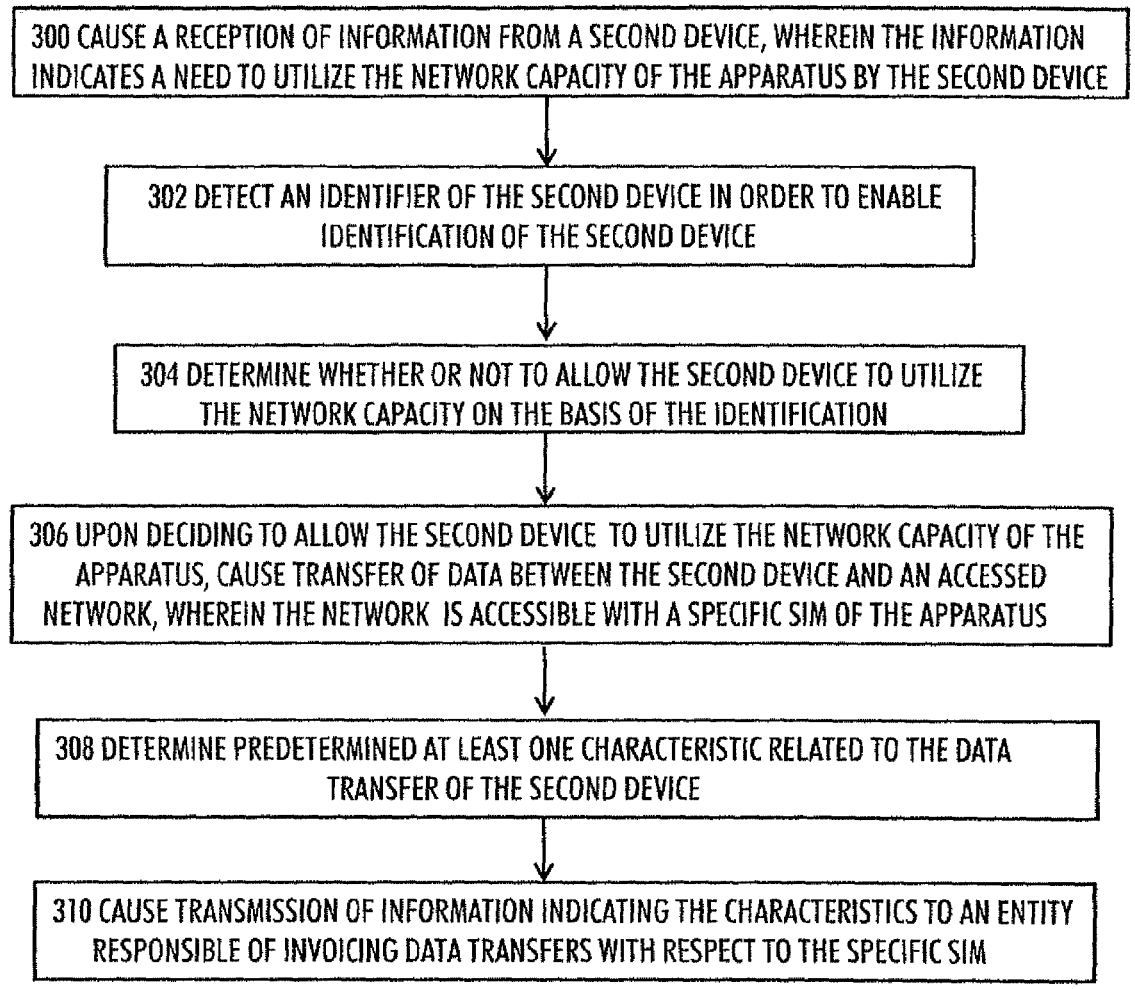
FIGS. 3A and 3B show methods according to some embodiments.

FIG. 3A shows a method proposed to be carried out by the apparatus 100 in which a device 100 may share the network with another device 140. The apparatus 100 may comprise the communication interface 106 for connecting to a network, such as to an 802.11 network or to a cellular network, for example.

Further, the apparatus 100 may comprise the at least one processor 102 and the at least one memory 104 including a computer program code (PROG), wherein the at least one memory 104 and the computer program code (PROG) are configured, with the at least one processor 102, to cause the apparatus 100 (i.e. the first device/apparatus) to receive, in step 300 of FIG. 3A, information from the second device 140, wherein the information indicates a need to utilize the network capacity of the apparatus 100 by the second device 140. In an embodiment, the information received from the second device 140 is a request of to utilize the network capacity of the device/apparatus 100.

In this light it may be understood that the apparatus 100 may, in an embodiment, be configured to serve as a wireless hot spot, i.e. as a link for the other devices to access the Internet, for example. As a wireless hot spot, the device 100 may share its (cellular or WLAN) network connection to other devices. It may be that the second device 140 has been searching for available networks and through the search encountered the network available via the first device 100. Alternatively, the second device 140 may discover the first device 100 locating nearby via any device discovery procedure known to skilled person, such as a device-to-device discovery, for example. The first device 100 may, for example, inform other devices within a certain range about the presence in the area via broadcasting, multicasting, etc.

Thereafter, the apparatus 100 may, in step 302, detect an identifier of the second device 140 in order to enable identification of the second device. In an embodiment, the identifier is a medium access control (MAC) address of the second device 100. Each device is allocated a certain MAC address and, consequently, the device 140 is identifiable by the MAC address. Alternatively any other identifier will do as long as the second device 140 may be uniquely identified on the basis of the identifier. There may a plurality of identifiers detected from the second device 140. Such use of many identifiers may increase the probabilities of correct identification and, thus, decrease the changes of possible misuse or falsification of an identifier. The first device 100 may obtain the identifier from the second device 140 via a dedicated communication link or via broadcast of information from the second device 140. The apparatus 100 may acquire the identity of the second device 140 by accessing a database stored in the network 180 and by comparing the obtained identifier to the database. In case the other device has the same service provider as the first device 100, the identification of the second device 140 may be simplified. In such scenario, the first device 100 may identify the second device 140 by examining its own database stored in the memory 104 or the database of the service provider, such as the UROS®, in the network 180. In yet another embodiment, the first device 100 sends the identifying data of the second device 140 to the service provider, which then either identifies or verifies the identification from its database. Thereafter, the service provider 190 may give or reject the access of the second device 140 to the network 180.

Consequently, the apparatus 100 may in step 304 determine whether or not to allow the second device to utilize the network capacity on the basis of the identification. One criterion may be that the second device 140 needs to be identified. In an embodiment, the device 100 may decide not to allow the second device 140 to utilize the network capacity of the apparatus 100 upon not being able to identify the second device 140. This may be advantageous for avoiding the misuse of the network capacity of the first device 100. For example, any unauthenticated device may not be allowed to utilize the capabilities of the first device 100.

Further, the device 100 may, in step 306, upon deciding to allow the second device 140 to utilize the network capacity of the apparatus 100, cause transfer of data between the second device 140 and an accessed network 180, wherein the network 180 is accessible with a specific SIM 101 of the apparatus 100. The apparatus 100 and the second device 140 may communicate via at least one of the following communication techniques: wireless network, Bluetooth, infrared. Even a wireless connection is feasible in some embodiments. As a result, the apparatus 100 may cause transmission and/or reception of data to and/or from the second device 140 by applying one of the above mentioned techniques in the communication connection 184 of FIG. 1.

As said, in an embodiment, the shared network capacity may be with respect to a wireless cellular communication network. In this case, the radio access network connection 186 to/from the apparatus 100 may be based on, for example, 2G, 3G, or the LTE/LTE-A. Alternatively, the network to be shared may be a WLAN or alike substantially local area wireless network having a prerequisite with respect to a presence of a certain SIM. In such scenario, the radio access communication 186 to/from the network 180 may apply broadband communication techniques, for example.

In an embodiment, the apparatus 100 may also allocate an authentication code to the second device 140 for accessing the network 180 through the apparatus 100. The second device 140 may then apply the received authentication code when transferring data via the apparatus 100. This may be advantageous as then the any third device may not be able to access the network 180 via the first apparatus 100 without permission from the first device 100.

Figures 4A, 4B:
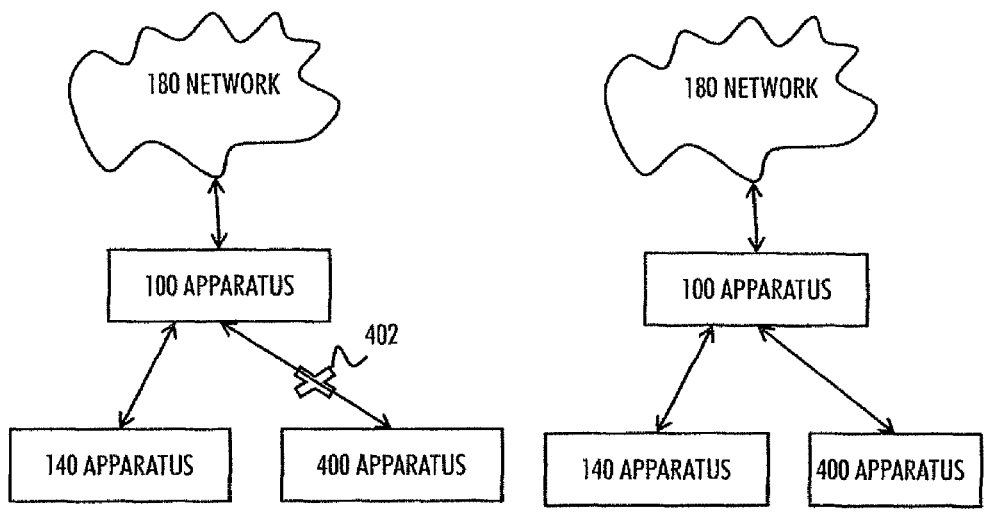
FIGS. 4A, 4B and 5 illustrate communication scenario according to some embodiments.

The network sharing circuitry 110 of FIG. 2 may be responsible for performing the network sharing with the second device 140. The circuitry 110 may thus decide how much capacity to share, the type of the sharing and/or whether to allow the second device 140 to utilize the network capacity at all. The sharing may be exclusive in a way that the device 100 allows only the second device 140 to utilize the network capacity of the apparatus 100. Alternatively, the device 100 may allocate only part of its network capacity to the second device 140. This is shown in FIGS. 4A and 4B, where, in FIG. 4A, it is depicted that the apparatus 100 may block the third apparatus 400 from accessing the network 180 shared by the apparatus 100, as shown with the cross 402. Only the second apparatus 140 is approved to access the shared network 180. It may even be that the apparatus 100 allocates all of its network resources/capacity to be utilized by the second device 140, i.e. the first apparatus 100 may not perform any data transfers to/from the network 180 for the purposes of the device 100, but only with respect to the second device 140. Alternatively, the sharing may be non-exclusive as shown in FIG. 4B, where the apparatus 100 may share only part of its network capacity to the second device 140 and additionally allow other devices, such as the device 400, to apply the network capacity of the first apparatus 100. I.e. the apparatus 100 may share the network with a plurality of other devices 140 and 400. Such non-exclusive share of the network capacity may be advantageous as it may increase the dynamic nature of the communication network, for example. However, the exclusive sharing may simplify the processes of the apparatus 100.

As an example of network sharing, the apparatus 100 may allocate a certain amount of percentage of its network capacity to the at least one second device 140. The percentage may be anything between 0 and 100 percents. The apparatus 100 may allocate, for example, 10 per cents of its network capacity to the second device 140. In other words, the second device 100 may use 10 per cents of the network capacity of the first device 100 for its own purposes. The amount of network capacity shared may be measureable with respect to bandwidth or time, for example.

In an embodiment, the apparatus 100 may acquire information from the entity 190 of FIG. 1 responsible of invoicing data transfers with respect to the specific SIM 101, wherein the information indicates whether or not the network capacity of the apparatus with respect to the specific SIM 101 may be utilized temporarily by the second device 140. E.g. the apparatus 100 may verify from the entity 190 that the network capacity of the apparatus 100 with respect to that SIM 101 may be utilized by another, identified device 140. Such entity 190 may be, for example, the provider of the PLMN or WLAN corresponding to the to-be-applied SIM, such as Elisa®, or the service provider of the apparatus 100, such as the UROS®. For example, in the case the SIM 101 or the set of SIMs 114 is/are prepaid SIM cards, the service provider (UROS®) may have already paid for the use of the SIM(s) (up to a certain predetermined amount) and, thus, the service provider may be seen as the entity 190 responsible of invoicing data transfers with respect to the SIM 101. Such verification may be advantageous as the entity 190 may have certain unauthorized users which the apparatus 100 may be unaware of. Such lack of authorization may be due to unpaid bills, for example. Thus, the entity 190 may inform the apparatus 100 that the network sharing with the device 140 is or is not acceptable.

Next, referring to FIG. 3A, the apparatus 100, and more particularly, the data transfer circuitry 113 may, in step 308, determine predetermined at least one characteristic related to the data transfer of the second device 140. In other words, the circuitry 113 may detect the amount of data being transferred for the benefit of the second device 140, how long the connection 184 for the purposes of data transfer has been running (a timer, although not shown in FIG. 2, may be applied for this), have any services requiring additional costs been applied by the second device 140 through the first device 100, etc. E.g. the circuitry 113 may detect the content of the data being transferred via the first device 100 and, as a result, be able to identify how many bytes have been transferred, which services from the network 180 (such as from the Internet) have been visited, do those visited services require additional costs, what was the speed of the connection, etc. For example, the speed of the shared connection may affect the costs required by the network 180. As a result, the predetermined at least one characteristic may comprise at least one of the following: the amount of data transferred, the duration of the data transfer, the identity of the second device 140, the network services visited, the date and/or time period during which the data was transferred (as it may affect the costs depending on the network 180).

Thereafter, the apparatus 100 may in step 310 transmit information indicating the at least one characteristic to the entity 190 responsible of invoicing data transfers with respect to the specific SIM 101. As said, such entity 190 may be, for example, the provider of the PLMN or WLAN corresponding to the applied SIM 101, such as Elisa® or Orange®. In another embodiment, the entity is the service provider of the apparatus 100, such as the UROS®. I.e. in this case the apparatus 100 sends the determined at least one characteristics to the service provider. The service provider, or the operator, as the entity 190, may apply the information, for example, in charging the second device 140 for the data transfers performed via the first device 100.

Figure 3B:
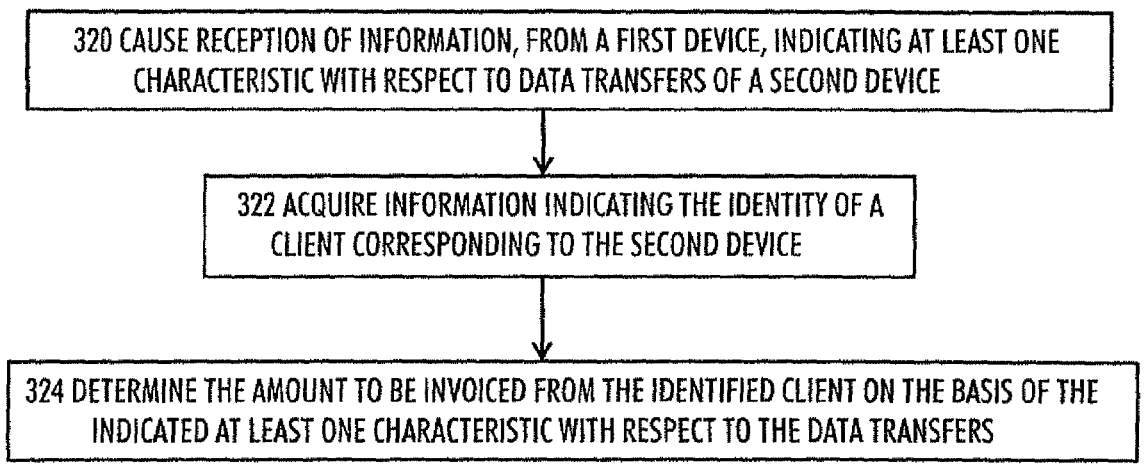

Let us take a look at the proposed solution from the point of view of the entity 190 referring to FIG. 3B. An embodiment provides an apparatus 190 for invoicing of data transfers with respect to a SIM. The apparatus may comprise at least one processor and at least one memory including a computer program code, wherein the at least one memory and the computer program code are configured to, with the at least one processor, cause the apparatus at least to receive information in step 320 of FIG. 3B, from the first device 100, indicating the at least one characteristic with respect to data transfers of the second device 140, wherein the first device 100 has carried out the data transfers between the second device 140 and the network 180 accessed with the specific SIM 101 of the first device 101. As said earlier, the first device 100 may have determined the at least one characteristic relating to the data transfers.

In step 322, the apparatus 190 may acquire information indicating the identity of a client corresponding to the second device 140. E.g. the entity 190 may itself determine the identity or it may receive the identity of the client from the first device 100. In an embodiment, the first device 100 transmits the acquired identifier, such as the MAC address, of the second device 140 to the entity 190, and the entity 190 detects the identity of the second device 140 and of the client based on the received identifier. In another embodiment, the identity of the second device 140 is determined by the first device 100, and the entity 190 detects the client behind the identified device 140.

In an embodiment, the entity 190 may determine the billing address of the client corresponding to the identified second device 140. It may be that the second device 140 is registered as a client of the entity 190. This may be the case when the second device 140 comprises, for example, at least one SIM card provided by the entity 190, such as an operator or a service provider (such as the UROS®). The billing address may refer to the postal address or to any address where the client may be reached, such as email, phone number, a credit card number, etc.

The entity 190 may further in, step 324, determine the amount to be invoiced from the identified client on the basis of the indicated at least one characteristic with respect to the data transfers. As the entity 190 is responsible for invoicing with respect to the specific SIM 101, it may comprise knowledge on the charging details of the network 180 accessible with the specific SIM 101. For example, the apparatus 190 may know that the data transfer of one megabyte of data costs (at a given time of a given date) a certain amount of money. As the apparatus 190 is aware of how many bytes were transferred, the entity may determine the accumulated amount of money to be invoiced. Thus, owing to the proposed embodiments, the entity 190 may be able to invoice the correct client behind the data transfers even though the first device 100 may have established the network connection to the network 180. It should be noted that from the network's 180 point of view, the first device 100 may be seen as the device transferring data even though the device 100 is only forwarding data between the network 180 and the second device 140.

In an embodiment, the entity 190 may determine at least one benefit with respect to the first device 100 which allowed the second device 140 to utilize the network capacity of the first device 100, and assign the determined at least one benefit to the first device 100 or to the client corresponding to the first device 100. It should be noted that the entity 190 may be aware of the client of the first device 100 as the first device 100 comprises the specific SIM card associated to the entity 190. The at least one benefit may comprise at least one of the following: increase of balance to a SIM account, a monetary compensation, a special offer. The monetary compensation may be cash deposit to the client's account. The increase of the balance may to the specific SIM card 101, or to another SIM card provided by the entity 190. The special offer may be that the next prepaid SIM card purchased from this entity 190 is in half price, for example. The apparatus 100 may then cause reception of such benefit information and update the information on the SIM cards accordingly, for example.

In an embodiment, the apparatus 100 comprises a plurality of prepaid SIMs 114 #1 . . . #N, as shown with reference numeral 114 in FIG. 2. Each of the SIMs 114 may correspond to a specific home operator (different local operators). The number of the subscriber identity modules may vary according to the circumstances, but there are at least two subscriber identity modules. One subscriber identity module may be a default subscriber identity module used normally (in user's home location or in a network where he/she has the coverage of the default home network, for example). Even a virtual subscriber identity module is feasible: it is a mobile phone number provided by a mobile network operator that does not require a SIM card to connect phone calls to the user's mobile terminal. In such a scenario, the at least one memory 104 of the apparatus 100 may be used to store subscriber data of the virtual subscriber identity module as required.

As known by a skilled person, different public land mobile networks (PLMNs) are available in different locations, such as in different countries. One of the PLMNs may be provided by the home operator. This may be the typical home PLMN the apparatus first (tries to) select. However, for example, when travelling, the home PLMN may not be available and the apparatus 100 needs to connect to another network. Roaming is the ability for a cellular customer to automatically make and receive voice calls, send and receive data, or access other services when travelling outside the geographical coverage area of the home network, by means of using a visited network. Roaming is technically supported by mobility management, authentication and billing procedures.

Unless the device carried by the traveller comprises the local SIM card corresponding to the local PLMN, the traveller may need to pay additional costs to access the network via roaming. As may be appreciated by a skilled person, owing to the set of SIMs #1 to #N, the apparatus 100 may have the ability to apply a current local network even when locating outside the coverage area of the typical or usual home network. This is because the plurality of SIMs may be related to different networks (PLMNs). Therefore, in one location a first SIM capable of connecting to a home network of the first SIM may be applied. In another location, a second SIM capable of connecting to a home network of the second SIM may be applied. This may simplify making phone calls and data transfers abroad, for example. Costs of making such data transfers abroad may be reduced as well.

The above is especially valid for cellular networks where typically a plurality of PLMNs exists. However, it should be noted that some wireless networks, such as WLANs, may require information related to the SIM of the apparatus 100 before allowing a connection to be established. Some networks may require the SIM to be provided by the same, or related, operator as the wireless network is, for example. Therefore, the existence of certain at least one SIM may be prerequisite for accessing the WLAN. For example, it may be that those WLANs, which are provided by an operator whose SIM is not in the apparatus 100, may not be accessed by the apparatus 100. Therefore, it may be advantageous to have the proposed solution performed in an apparatus equipped with multiple SIMs.

In an embodiment, the SIMs, e.g. the SIM cards, in the device 100 are prepaid SIM cards. The prepaid SIM cards may be purchased by a certain service provider, such as the UROS®. The service provider may have installed the SIM cards to the device 100 as well. However, the user of the device 100 may have done the installation instead. The device 100 may then apply the prepaid SIMs for as long as the balance of each SIM card allows. The prepaid SIM cards may correspond to a plurality of local PLMNs for different locations. For example, one prepaid SIM card may correspond to a network provided by Elisa, Finland, whereas another prepaid SIM card may correspond to a network provided by Orange, France. The service provider may charge the user for the prepaid SIM cards, for example. Applying prepaid SIMs may be advantageous as then the device may know how much balance is left in each prepaid SIM card. Further, as the user may not exceed the balance of the prepaid SIM card, the costs remain reasonable, i.e. within the limits set by the prepaid SIM cards.

In such case, where there is a plurality of SIMs 114 in the apparatus 100, the apparatus 100 may further need to apply an optimal SIM among the plurality of SIMs 114 in accessing the network 180 to be shared, wherein the optimal SIM is selected among the plurality of SIMs 114 on the basis of predetermined criteria. Once the optimal SIM 101 to be applied is known, the apparatus 100 may determine which entity is responsible of invoicing data transfers with respect to the applied, specific SIM 101 among the plurality of SIMs 114.

Let us take a closer look on how the apparatus 100, and more particularly, the SIM selection circuitry 112 of FIG. 2, performs the optimal SIM selection. As shown in FIG. 2, the apparatus 100 may comprise a plurality of SIMs 114. In an embodiment, there are at least three SIMs, such as three prepaid SIM cards, in the set of SIMs 114 comprised in the apparatus 100. Such use of many SIMs may allow a high degree of flexibility for the device 100 in selecting the optimal SIM in different locations, for example. It is to be noted that typically devices, e.g. devices that may share network with another device, such as mobile phone hot spots, have only one default SIM, which is used in accessing the network.

However, in the proposed solution, the apparatus 100 may select one the plurality of SIMs 114 to be applied in accessing the network 180 via the communication connection 186. The SIM may be selected for the purposes of improving or enabling the communication between the second device 140 and the network 180. In other words, in an embodiment, the requirements of the first device 100, with respect to which SIM is to be applied, may be disregarded and the requirements of the second device 140 may be taken into account. Thus, in this embodiment, the predetermined criteria take into account data relating to the plurality of subscriber identity modules 114 in the apparatus and data relating to the second device 140.

However, in an embodiment, the requirements of the device 100 are prioritized and the SIM is selected based on the needs of the apparatus 100. Thus, the predetermined criteria take into account data relating to the plurality of subscriber identity modules 114 in the apparatus and data relating to the apparatus 100. It should be noted that in an embodiment, the requirements of both, the apparatus 100 and the second device 140 are taken into account. With this kind of processing, utilization of many and wide range of subscriber identity modules 114 becomes possible, and, furthermore, selection of the right subscriber identity module based on the needs of the apparatus 100 or and/or the needs of the second device 140 becomes user friendly and automatic (or at least semi-automatic if user interaction is required for the selection or its confirmation).

It should be noted that, in an embodiment, the optimal SIM has already been selected prior to the second device 140 requests the network access. Thus, in such case the first device 100 may continue to apply the previously selected SIM. However, if the data relating to the second device 140 is taken into account in the selection of the optimal SIM, then it may be that the optimal SIM is re-selected at least partly on the basis of the acquired data from the second device 140. As a result, the optimal SIM now selected may be the same or different than the SIM that was previously selected.

Let us next consider what the data relating to the SIMs 114 may comprise. In an example embodiment, obtaining the data relating to the subscriber identity modules comprises at least one of the following: reading the data from the subscriber identity modules, receiving the data wirelessly from a service provider, such as the UROS®, or receiving the data from a user interface manipulated by a user, for example. The data relating to the subscriber identity modules 114 may include, for example, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, two passwords (personal identification number, PIN, for ordinary use, and PIN unlock code, PUK, for PIN unlocking), and other data. The subscriber data may also include other specific data such as the short message service centre (SMSC) number, service provider name (SPN), service dialling numbers (SDN), advice-of-charge parameters, and value added service (VAS) applications. Further information may be found in the GSM Technical Specification 11.11.

Let us next consider the data relating to the apparatus 100 and/or to the second device 140. Each of the below mentioned information items may also be obtained with respect to the apparatus 100, in case the requirements of the apparatus 100 are prioritized and/or taken into account. However, for the sake of simplicity, let us consider these information items being related to the second device 140 in the following. In an embodiment, the apparatus 100 may be caused to obtain data relating to the second device, wherein the obtained data indicates at least one of the following: location of the second device 140, country code of the second device 140, time with respect to the second device 140, date with respect to the second device 140, day of the week with respect to the second device 140, information of available operators with respect to the second device 140, information of available networks with respect to the second device 140, type of the second device 140, model (Nokia® N9, Samsung® Galaxy, Apple® iPhone 4, a device with a plurality of SIMs, etc.) of the second device 140, info about applications (games, email, Skype™, etc.) in use or used in the second device 140.

Location of the second device 140 may be obtained so that the apparatus 100 may select which SIM to apply in order to allow the second device 140 to communicate through the current home network without roaming. Location of the second device 140 may be obtained by use of a satellite navigation receiver of the second device 140, for example, but also from cellular location based info, such as a location and/or tracking area, for example. Time, date, and day of the week may be obtained from a watch/calendar application of the second device 140 or of any device coupled/associated with the second device 140, and such information may be relevant when deciding which subscriber identity module 114 to use as the charges may vary according to the time of day, day of the week, or also during special holidays. Information relating to the available operators and available networks may be obtained from an appropriate application of the second device 140 as the second device 140 may listen to certain frequencies. Such information may also be relevant for deciding the right subscriber identity module 114 for use as the user may have some preferences relating to the operator, and also the type of the network may affect the decision. The type of the network, for example, may set limits to the data transfer rate, and depending on the user's requirements, a high enough data transfer rate may be desirable. The data relating to the second device 140 may be obtained via the connection 184 of FIG. 1, for example.

In an embodiment, the predetermined criteria for selecting the SIM comprises selecting the optimal SIM on the basis of network coverage criterion, available services criterion, quality of service criterion, costs of using the subscriber identity module criterion, location of the apparatus or the of second device criterion. Thus, the SIM may be selected so that there is high enough signal quality, so that at least certain service(s) are available, so that the costs per data unit transferred is below a certain limit, or so that the local PLMN without roaming may be applied, for example.

The various criteria may be used alone or in combination. A simple selection ground may be formulated as follows: "Use the cheapest subscriber identity module 114 that provides the required service at the required quality of service in the present location of the second device 140 by network operator A if available, and if operator A is not available then by any other operator fulfilling the criteria". However, this is only one non-limiting example embodiment. A skilled person may appreciate that any of the above mentioned criteria for selecting the SIM may be applied alone in combination with another criterion.

In an embodiment, the apparatus 100 may treat one of the SIMs 114 as the default SIM and to use the default SIM when no information indicating otherwise is obtained. For example, after start-up of the second device 140 or the apparatus 100, the default SIM may be applied unless information, such as location information, is obtained. The default subscriber identity module may, besides being the starting subscriber identity module, be also the controlling subscriber identity module, and possibly also the back-up subscriber identity module.

The apparatus 100 may detect roaming of the second device 140, and perform the selection of the optimal SIM for use by the second device 140 such that roaming is avoided.

In an embodiment, the apparatus 100 may scan the available networks and select the optimal SIM on the basis of which networks were found. For example, the apparatus 100 may select the SIM that corresponds to the operator which is also the provider of the found network (either cellular network or any other type of network, such as WLAN).

In an embodiment, the apparatus 100 may detect if any subscriber identity module is taken out of the use and instead at least one more optimal SIM is taken into use. In such case, in an embodiment, the apparatus 100 may switch on a call forwarding from the currently applied SIM to one of the more optimal SIM which is taken into use. With such call forwarding (or diversion) an incoming call to a specific, removed SIM is redirected to the currently used, more optimal SIM.

In an embodiment, the apparatus 100 may perform said selection of the optimal SIM for use by the second device 140 in two stages, by pre-selecting SIMs that are usable on the basis of the data relating to the SIMs of the apparatus 100 and the data relating to the second device 140, and, thereafter, by selecting at least one SIM for use by the second device 140 from among the pre-selected subscriber identity modules on the basis of the at least one predetermined criterion. With this kind of two-stage selection, processing may become simpler, as the pre-selection removes unfeasible SIMs, whereupon the final selection may be made among a smaller set of SIM(s).

Regarding the selection of the optimal at least one SIM, the reader is also referred to previous European patent applications by the Applicant, the applications having application numbers 12151906.0, and 12151908.6.

In general, the second device 140 may be any device requiring for connection to the network, such as a mobile phone, a tablet pc, a portable computer, or a computer. However, the second device 140 may not comprise the required SIM(s) for accessing any of the available networks 180. It should also be noted that some networks 180 may require the existence of a plurality of SIMs and, therefore, in these embodiments, the apparatus may select a plurality of SIMs to be applied in the network connection for the benefit of the second device 140.

Figure 5:
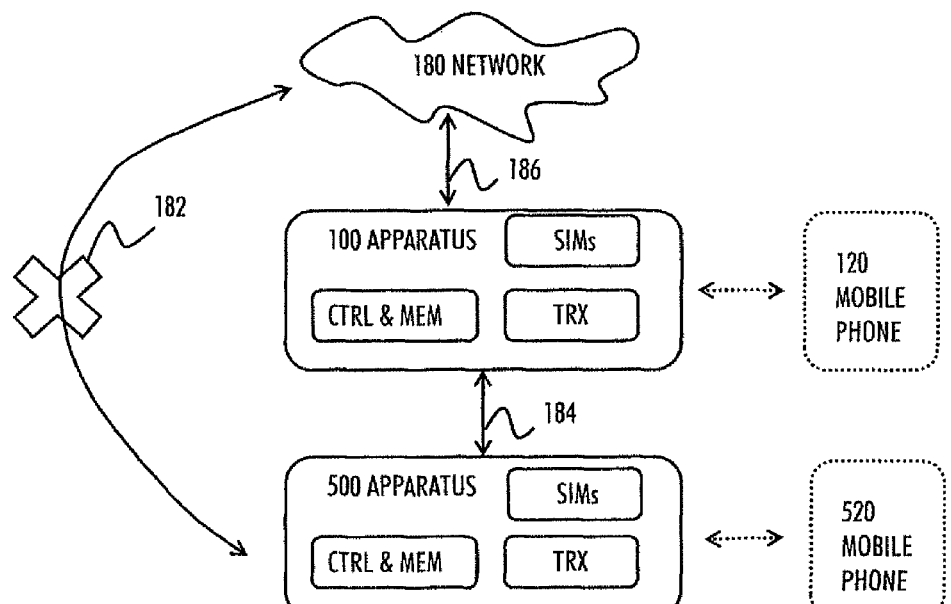

In an embodiment, as shown in FIG. 5, the apparatus 100 may be interoperating with another end user device, such as with a mobile phone 120. The dotted lines denote that the presence of the mobile terminal 120 is not mandatory, but rather one possible embodiment. It is also shown that the second device 500 which requires the utilization of the network connection of the apparatus 100 may comprise a set of SIMs, similarly as the apparatus 100. In other words, in an embodiment, the apparatuses 100 and 500 may be of similar kind, possible provided by the same manufacturer. The SIMs in both devices 100 and 500 may be prepaid SIMs, wherein each SIM may correspond to a certain local network/operator. In an embodiment, a service provider, such as UROS®, has provided the SIMs to the apparatuses 100 and 500. Although not mandatory, the second device 500 may also interoperate with another end user device, such as with a mobile phone 520.

Thus, in an embodiment, the entity 190 responsible of invoicing data transfers with respect to the applied SIM is a service provider of the apparatus 100. The apparatus 100 may further detect, on the basis of the identifier of the second device 140/500 that the service provider 190 of the second device 140/500 is the same as that of the apparatus 100. The identifier may have a certain predetermined sequence corresponding to the service provider, for example. This may be advantageous so that the client identification may be carried out on the basis of the device identification information accessible by the apparatus 100. As both of the devices 100 and 140/500 may be associated with the same service provider 190, such as with the UROS®, the first device 100 may be able to identify the device 140/500 (and possibly the client) based on information on an anchor SIM card of the apparatus 100, for example, or based on a database of the service provider 190. The anchor SIM card may be one of the SIMs 114 of the apparatus and contain information related to the service provider 190, such the type of identifiers given to the devices associated with the same service provider 190. Further, when the devices are both served by the same service provider as the entity 190, the service provider may identify the client corresponding to the second device 140/500 on the basis of the device identification information comprised in the apparatus 190, such as stored to the memory 804 as will be described with reference to FIG. 8.

Figure 7:
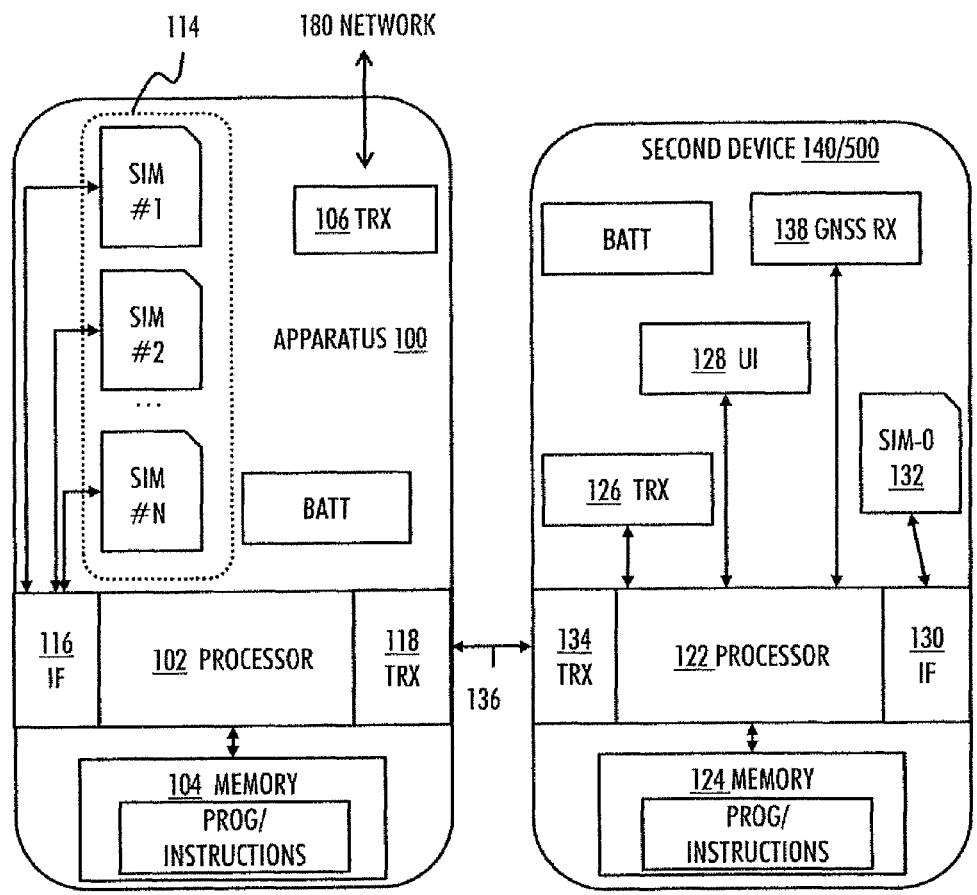
FIG. 7 illustrates how the apparatus interoperates with a mobile phone, according to an embodiment.

Let us take a closer look on how the apparatus 100/500 may interoperate with the mobile phone 120/520 by referring to FIG. 7. FIG. 7 is depicted from the point of view of the apparatus 100, but a skilled person understands that the same may be applied between the apparatus 500 and the mobile phone 520.

As shown, the apparatus 100 may comprise an interface 116 to the SIMs 114. There may also be another interface (IF) 130 to the subscriber identity module 132 possibly located in the mobile terminal 120. The SIM 132 of the mobile terminal 120 may be the SIM corresponding to the typical or usual home PLMN, whereas the SIMs 114 in the apparatus 100 may correspond to other PLMNs. The SIMs 114 in the apparatus 100 may, in an embodiment, be prepaid SIMs related to different home networks with a certain amount of balance which the apparatus may use for the benefit of itself, of the mobile terminal 120 or of the second device 140/500. This may be advantageous so that one of the SIMs in the apparatus 100 may be selected in order to enable communication in a local home network, instead of roaming, even when traveling. For example, when the mobile terminal 120 or the second device 140/500 makes a phone call, data transfer, etc., when locating outside of the home network of the SIM 132 of the mobile terminal, the apparatus 100 may apply one of the SIMs in the apparatus 100 for the purposes of the cellular communication of the mobile terminal 120 or of the second device 140/500. The applied SIM may be the one that allows the mobile terminal 120 or the second device 140/500 to communicate in the local home network of the selected SIM, instead of roaming. Thus, the costs of the data transfer may be reduced.

The apparatus 100 may or may not comprise a battery, depending on the power requirements of the apparatus 100 and the possibility to obtain electric energy from an external source such as the mobile terminal 120. Furthermore, both the mobile terminal 120 and the apparatus 100 may comprise a wired/wireless standard/proprietary communication protocol interface 118, 134 enabling two-way communication 136 between the mobile terminal 120 and the apparatus 100. In an example embodiment, the interface 118, 134 is implemented as a serial or parallel communication bus, hardware line, an USB (Universal Serial Bus) cable with appropriate connectors, a SIM bus according to ISO/IEC 7816-3, a wireless Bluetooth link, a wireless WLAN link, a wireless Wi-Fi (Wireless Fidelity) link, a serial bus such as UART (Universal Asynchronous Receiver/Transmitter), I2C (Inter-Integrated Circuit) or SPI (System Packet Interface).

In an example embodiment, the mobile terminal 120 may be a mobile phone comprising the default subscriber identity module 132, a transceiver (TRX) 126 capable of connecting the mobile terminal to a wireless cellular communication system, a user interface 128, a battery, at least one control circuitry (such as a processor) 122 and at least one memory 124 with instructions/program. The instructions, when executed by the processor 122 may cause the mobile terminal 120 to perform functionalities related to performing data transfer, phone calls, etc. It may be noted that in the example embodiment of FIG. 7, the apparatus 100 does not comprise a user interface of its own, but the user interaction, if any, may be performed through the user interface 128 of the mobile terminal 120. However, in another example embodiment, the apparatus 100 may comprise a user interface.

Furthermore, the mobile terminal 120 may comprise a positioning receiver 138 receiving external location information, which may be utilized to generate location of the mobile terminal 120. The positioning receiver 138 may be a receiver of a global navigation satellite system (GNSS). Such a system may be the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. Besides global navigation satellites, the positioning receiver 1230 may also determine its location by utilizing other known positioning techniques. It is well known that by receiving radio signals from several different base stations, a mobile phone may determine its location, for example. Such a positioning receiver may also be equipped in the second device 140/500 or in the mobile terminal 520 associated with the second device 500 for allowing the location of the second device 140/500 to be acquired.

In an embodiment, the mobile terminal 120 may be seen as the second device 140 of FIG. 1. The mobile terminal 120, as the second device 140, may thus need the network access but the default SIM 132 may not be the required SIM card. Therefore, it may initiate a search for wireless networks and come across the apparatus 100, which may have the required SIM.

In an embodiment, the requirements of the mobile terminal 120 are taken into account when selecting the optimal SIM to be used. In an embodiment, as shown in FIG. 5, the second device 500 is also interoperating with a mobile phone, a laptop, a tablet, etc. in the manner described with respect to FIG. 7. Therefore, it may be so that the mobile terminal 520 requires access to the network, but may not do so via the second device 500. This may be due to lack of certain SIM in the second device 500. Therefore, the second device 500 may initiate a search for wireless networks and come across the apparatus 100, which may have the required SIM. In this light it may be appreciated that any of the data relating to the second device 140/500, which is at least partly used for selecting the optimal SIM, as described earlier, is obtainable either directly from the second device 140/500 or from the mobile terminal 520 associated with the second device 500, as shown in FIG. 5. Thus, for example, the positioning receiver may be present in the second device 140/500 or in the mobile terminal 520. In yet another embodiment, the positioning receiver is present in the apparatus 100 for determining the position of the apparatus 100. This may be advantageous as it is the location of the first device 100 that may matter for determining the local home PLMN and, thus, affect in the selection of the optimal SIM. Typically, the devices 100 and 140/500 are relatively close to each other so that their respective locations in terms of the local home PLMN is irrelevant, but there may be situations where the local home PLMN may vary between the devices 100 and 140/500.

Figure 6:
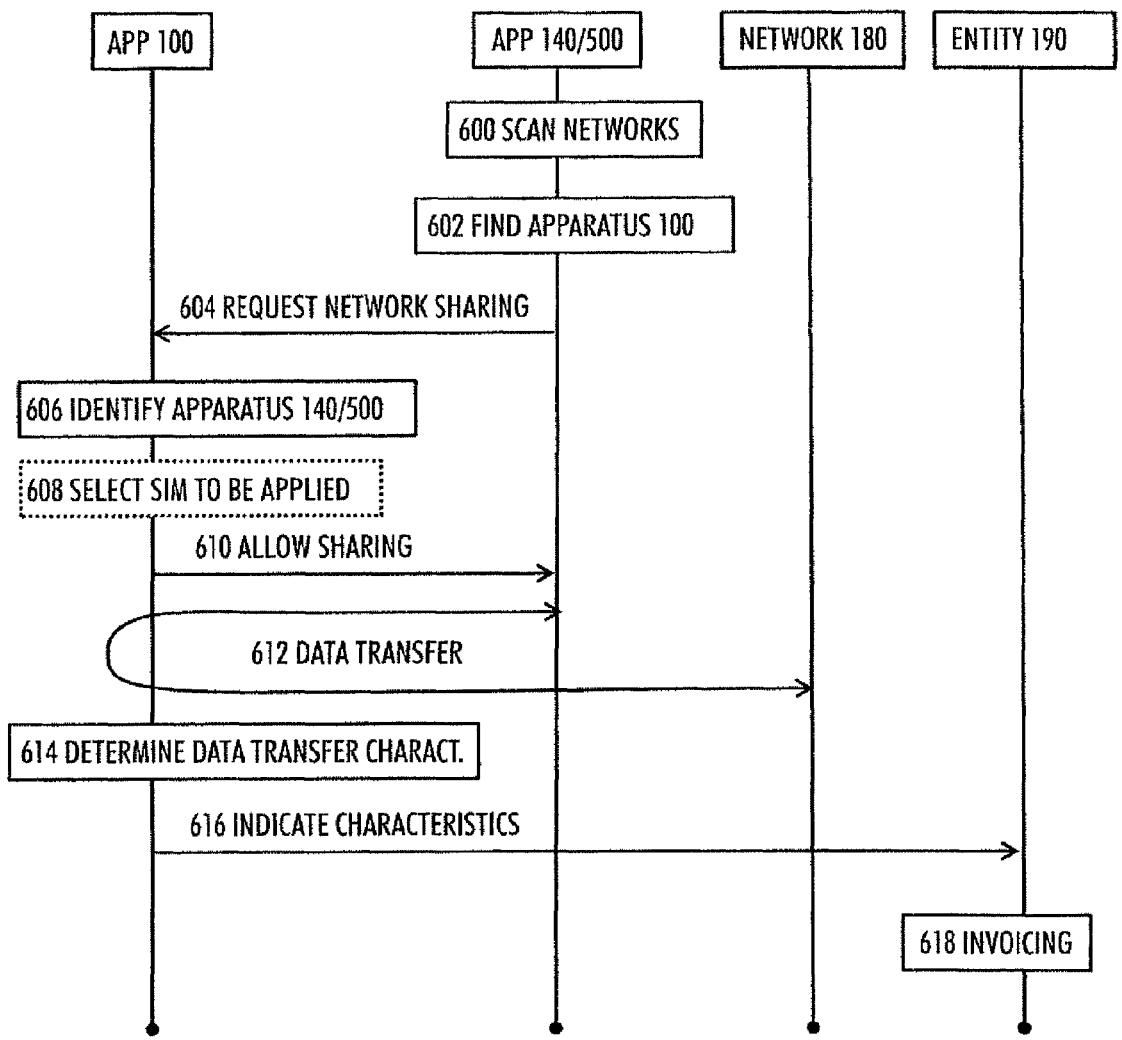
FIG. 6 depicts a signaling flow diagram according to an embodiment.

As said, the second device 500 may also comprise a set of SIMs. However, it may be that the set of SIMs of the second device 500 does not comprise the SIM(s) required for network access at the given location. Therefore, the second device may need to apply the network connection of the device 100. Let us consider a signaling flow diagram shown in FIG. 6. First, the device 140/500, as the second device in the need of network access, may in step 600 scan the networks in the area. The device 140/500 may detect that it does not comprise a certain SIM required for the network access or that no networks are present in the area. It may even be that the second device 140/500 does have SIMs which would be applicable for the access of a certain found network but which would require roaming to take place. In order to save expenses, the second device 140/500 may decide not to apply the SIM requiring roaming. Instead, the device 140/500 may have found the apparatus 100 in the area in step 602. The second device 140/500 may decide to check whether the first device 100 has the required SIM and whether the second device 140/500 may utilize the network capacity of the device 100, i.e., apply the network 180 via the first device 100. Thus, the device 140/500 may transmit a request for network sharing to the device 100 in step 604.

The apparatus 100 may require an identifier of the second device 140/500 to be received in step 606. The identifier, such as MAC-address, may be used for identifying the second device 140/500. In an embodiment, the identifier may indicate that the second device 500 is served by the same service provider, such as the UROS®, as the apparatus 100. This may simplify the identification and authentication of the second device 500 as the apparatus 100 may immediately identify the second device 500 and the client based on internal database or based on a database of a service provider, such as the UROS®. In case the second device 140 is not of the same kind, the authentication process may be more complicated and requiring, for example, access to an identifier database in the network 180. Upon being able to identify the device 140/500, the apparatus 100 may decide to allow the sharing.

Thereafter the apparatus 100 may if required, in step 608, select the optimal SIM (or simply apply the previously selected SIM) according to any of the embodiments presented. In case there is only one SIM in the apparatus 100, the step 608 may be omitted. The apparatus 100 may then indicate the apparatus 140/500 that the network may be shared in step 610. Accordingly, the apparatus 100 may forward data transferred between the network 180 and the second device 140/500 in step 612.

Thereafter, in step 614 the apparatus 100 may determine the at least one characteristic related to the data transfer for the benefit of the second device 140/500. Once the determined characteristics have been indicated to the entity 190 in step 616, the entity 616 may determine the details concerning charging the second device 140/500 in step 618, as explained above.

Figure 8:
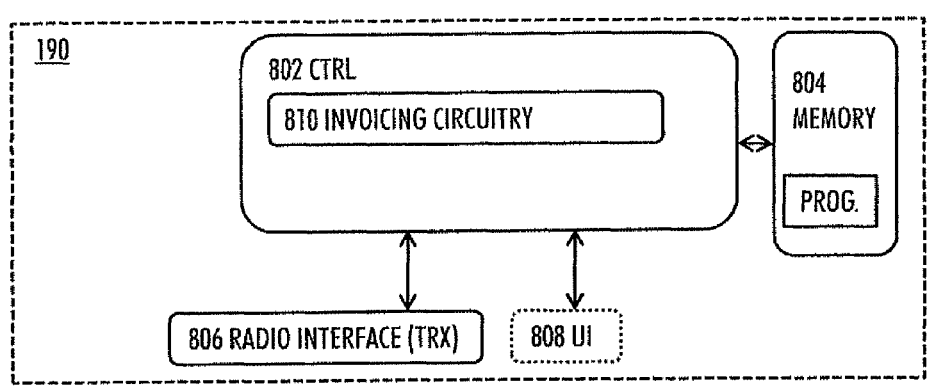
FIG. 8 shows an apparatus according to some embodiments.

FIG. 8 provides an embodiment of the apparatus 190, such as an apparatus of the service provider, e.g. the UROS®. The apparatus 190 may comprise a control circuitry (CTRL), such as at least one processor 802, and at least one memory 804 including a computer program code (PROG), wherein the at least one memory 804 and the computer program code (PROG), are configured, with the at least one processor 802, to cause the apparatus 100 to carry out any of the embodiments presented in the application with respect to the entity/apparatus 190. It should be noted that FIG. 8 shows only the elements and functional entities required for understanding a processing system of the apparatus 190. Other components have been omitted for reasons of simplicity. It is apparent to a person skilled in the art that the apparatus may also comprise other functions and structures. In an embodiment, the apparatus 190 may be comprised in a server accessible via the network 180, for example.

The apparatus 190 may further comprise radio interface component unit (TRX) 806 providing the apparatus with radio communication capabilities with the radio access network 180. The radio interface components 806 may comprise standard well-known components such as amplifier, filter, frequency-converter, (de)modulator, and encoder/decoder circuitries and one or more antennas. The TRX 806 may also be applied for communication with the device 140, 500, for example.

The apparatus 190 may also comprise a user interface 808 comprising, for example, at least one keypad, a microphone, a touch display, a display, a speaker, etc. The user interface may be used to control the apparatus by the user.

As said, the apparatus 100 may comprise a control circuitry 802, e.g. a chip, a processor, a micro controller, or a combination of such circuitries causing the apparatus to perform any of the embodiments of the invention. The control circuitry 802 may be implemented with a separate digital signal processor provided with suitable software embedded on a computer readable medium, or with a separate logic circuit, such as an application specific integrated circuit (ASIC). The control circuitry 802 may comprise an interface, such as computer port, for providing communication capabilities.

The memory 804 may store software (PROG) executable by the at least one control circuitry 802. The memory 804 may be connected to the control circuitry 802. However, memory may also be integrated to the control circuitry 802 and, thus, no memory 804 may be required. The memory 804 may be implemented using any suitable data storage technology, such as semiconductor based memory devices, flash memory, magnetic memory devices and systems, optical memory devices and systems, fixed memory and removable memory. The memory 804 may comprise data related to the devices served by the apparatus 190, the client corresponding to the devices, the billing addresses, etc.

The control circuitry 802 may comprise an invoicing circuitry 810 for determining the amount to be invoiced from the identified client on the basis of the indicated at least one characteristic with respect to the data transfers, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configure to carry out embodiments of any of the FIGS. 1 to 8. In an embodiment, the at least one processor 102, the memory 104, and the computer program code form an embodiment of processing means for carrying out the embodiments of the invention. In an embodiment, the at least one processor 802, the memory 804, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus including a plurality of subscriber identity modules (SIMs) from different network operators, the apparatus comprising: at least one processor and at least one memory including a computer program code, wherein the at least one memory and the computer program code are configured to, with the at least one processor, cause the apparatus at least to: cause a reception of information from a second device, wherein the information indicates a need to utilize network capacity of the apparatus by the second device; detect an identifier of the second device in order to enable identification of the second device; determine whether or not to allow the second device to utilize the network capacity on the basis of the identification; upon deciding to allow the second device to utilize the network capacity of the apparatus, select an optimal SIM among the plurality of SIMs for accessing a network to be shared, wherein the optimal SIM is selected among the plurality of SIMs on the basis of predetermined criteria, and cause transfer of data between the second device and an accessed network, wherein the network is accessible with the selected SIM of the apparatus; determine predetermined at least one characteristic related to the data transfer caused by the second device via the apparatus; determine which entity is responsible of invoicing data transfers with respect to the selected SIM; and cause the apparatus at least to: cause transmission of information indicating the at least one characteristic to an entity responsible of invoicing data transfers with respect to the selected SIM so as to allow the entity to charge a client corresponding to the second device on the basis of the determined at least one characteristic; cause a reception of information indicating an assignment of at least one benefit from the entity responsible for invoicing data transfers with respect to the selected SIM, wherein the at least one benefit comprises an increase of balance to a SIM account; and update the information of the SIM account accordingly.

2. The apparatus of claim 1, wherein the apparatus is configured to serve as a wireless hot spot.

3. The apparatus of claim 1, wherein the identifier of the second device is a medium access control address.

4. The apparatus of claim 1, wherein the apparatus is further caused to:
   decide not to allow the second device to utilize the network capacity of the apparatus upon not being able to identify the second device.

5. The apparatus of claim 1, wherein the apparatus is further caused to:
   verify from the entity responsible of invoicing data transfers with respect to the specific SIM whether or not the network capacity of the apparatus with respect to the specific SIM may be utilized temporarily by the second device, wherein the decision whether to allow the utilization or not by the entity is based on whether the second device is associated to an authorized or an unauthorized user from a point of view of the entity.

6. The apparatus of claim 1, wherein the shared network capacity is with respect to a wireless cellular communication network.

7. The apparatus of claim 1, wherein the predetermined at least one characteristic comprise at least one of the following: the amount of data transferred, the duration of the data transfer, the identity of the second device, the network services visited, the date and/or time period during which the data was transferred.

8. The apparatus of claim 1, wherein the entity responsible of invoicing data transfers with respect to the applied SIM is a service provider of the apparatus, and wherein the apparatus is further caused to:
   detect, on the basis of the identifier of the second device, that the service provider of the second device is the same as that of the apparatus; and
   identify the client corresponding to the second device, on the basis of the device identification information accessible by the apparatus.

9. An apparatus for invoicing of data transfers with respect to a specific subscriber identity modules (SIM), comprising:
   at least one processor and at least one memory including a computer program code, wherein the at least one memory and the computer program code are configured to, with the at least one processor, cause the apparatus at least to:
   cause reception of information, from a first device, indicating at least one characteristic with respect to data transfers caused by a second device, wherein the first device has carried out the data transfers between the second device and a network accessed with a specific SIM of the first device, wherein the first device comprises a plurality of SIMs corresponding to different network operators and the apparatus is responsible for invoicing data transfers with respect to that one of the plurality of SIMs that is used by the first device for accessing the network on behalf of the second device;
   acquire information indicating the identity of a client corresponding to the second device;
   determine the amount to be invoiced from the identified client on the basis of the indicated at least one characteristic with respect to the data transfers;

determine at least one benefit with respect to the first device that allowed the second device to utilize the network capacity of the first device, wherein the at least one benefit comprises an increase of balance to a SIM account; and cause a transmission of indication of the determined at least one benefit to the first device.

10. The apparatus of claim 9, wherein the apparatus is further caused to:

determine the billing address of the client corresponding to the identified second device.

11. The apparatus of claim 9, wherein the predetermined at least one characteristic comprise at least one of the following: the amount of data transferred, the duration of the data transfer, the identity of the second device, the network services visited, the date and/or time period during which the data was transferred.

12. The apparatus of claim 9, wherein the first device and the second device both comprise a plurality of prepaid SIMs provided to the devices by the apparatus as a service provider of the devices, and wherein the apparatus is further caused to:

identify the client corresponding to the second device, on the basis of the device identification information comprised in the apparatus.

* * * * *